US012610883B2

(12) United States Patent
Kumar et al.

(10) Patent No.: US 12,610,883 B2
(45) Date of Patent: Apr. 28, 2026

(54) SPEED CONTROL SYSTEM, SELF-PROPELLED MACHINE INCLUDING SAME, AND METHOD FOR CONTROLLING TRAVEL SPEED OF SELF-PROPELLED MACHINE

(71) Applicant: Honda Motor Co., Ltd., Tokyo (JP)

(72) Inventors: Surender Kumar, Mebane, NC (US); Ayman Zohbi, High Point, NC (US)

(73) Assignee: HONDA MOTOR CO., LTD., Tokyo (JP)

( * ) Notice: Subject to any disclaimer, the term of this patent is extended or adjusted under 35 U.S.C. 154(b) by 386 days.

(21) Appl. No.: 18/502,293

(22) Filed: Nov. 6, 2023

(65) Prior Publication Data

US 2025/0143210 A1    May 8, 2025

(51) Int. Cl.
*A01D 34/69* (2006.01)
*A01D 34/68* (2006.01)

(52) U.S. Cl.
CPC ......... *A01D 34/69* (2013.01); *A01D 34/6806* (2013.01); *A01D 2034/6843* (2013.01)

(58) Field of Classification Search
CPC ............ A01D 34/69; A01D 2034/6843; B25D 51/001
See application file for complete search history.

(56) References Cited

U.S. PATENT DOCUMENTS

| | | | |
|---|---|---|---|
| 5,842,552 A * | 12/1998 | Colber, Jr. ................ | F16C 1/22 |
| | | | 74/502.2 |
| 6,082,083 A | 7/2000 | Stalpes et al. | |
| 7,540,131 B2 | 6/2009 | Stover et al. | |
| 8,429,885 B2 | 4/2013 | Rosa et al. | |
| 9,651,138 B2 * | 5/2017 | Helin ................. | F16H 59/0278 |
| 9,696,749 B2 | 7/2017 | Kaskawitz et al. | |
| 11,337,369 B2 | 5/2022 | Kurihara et al. | |
| 11,503,760 B2 | 11/2022 | Jiang | |
| 11,570,948 B2 | 2/2023 | Laurin et al. | |

(Continued)

FOREIGN PATENT DOCUMENTS

| | | |
|---|---|---|
| CN | 205510937 U | 8/2016 |
| CN | 206961735 U | 2/2018 |

(Continued)

*Primary Examiner* — Christopher D Hutchens
(74) *Attorney, Agent, or Firm* — KENEALY VAIDYA LLP

(57) ABSTRACT

A speed control system for an electric drive motor of a self-propelled machine can include a switch assembly, speed lever, potentiometer, actuator lever, cable, and controller. The switch assembly can select a requested maximum speed from a plurality of predetermined maximum travel speeds, and can output a maximum speed signal that is indicative of the requested maximum speed. The speed lever can be movable to any of a plurality of travel speeds, including a zero speed. The potentiometer can be configured to output a requested speed signal that is indicative of the requested travel speed. The controller can be configured to output a motor speed signal to the electric drive motor, the motor speed signal is based on the maximum speed signal and the requested speed signal and causes the electric drive motor to operate at an output speed that corresponds to the motor speed signal.

20 Claims, 5 Drawing Sheets

(56) References Cited

U.S. PATENT DOCUMENTS

| | | | | |
|---|---|---|---|---|
| 2007/0169743 A1 * | 7/2007 | Kobayashi | F02D 11/10 | |
| | | | 123/352 | |
| 2007/0271892 A1 * | 11/2007 | Sasaoka | A01D 69/025 | |
| | | | 56/10.2 R | |
| 2011/0000175 A1 * | 1/2011 | Lahey | A01D 34/68 | |
| | | | 56/10.8 | |
| 2013/0081500 A1 * | 4/2013 | Helin | A01D 34/82 | |
| | | | 474/8 | |
| 2018/0116119 A1 * | 5/2018 | Wu | A01D 69/06 | |
| 2018/0146617 A1 * | 5/2018 | Oota | A01D 34/824 | |
| 2020/0196521 A1 * | 6/2020 | Xiao | A01D 34/824 | |
| 2023/0115229 A1 | 4/2023 | Okamura et al. | | |

FOREIGN PATENT DOCUMENTS

| | | |
|---|---|---|
| CN | 104641787 B | 4/2019 |
| CN | 111615915 A | 9/2020 |
| CN | 113496842 A | 10/2021 |
| CN | 110495302 B | 8/2022 |
| CN | 217407066 U | 9/2022 |
| CN | 115316107 A | 11/2022 |
| KR | 102259221 B1 | 5/2021 |

* cited by examiner

SPEED CONTROL SYSTEM, SELF-PROPELLED MACHINE INCLUDING SAME, AND METHOD FOR CONTROLLING TRAVEL SPEED OF SELF-PROPELLED MACHINE

BACKGROUND

The disclosed subject matter relates to a self-propelled walk-behind power equipment. More particularly, the disclosed subject matter relates to methods and apparatus that control the travel speed of the power equipment (also referred to as a machine).

Walk-behind power equipment, such as but not limited to lawnmowers, can include a drive assembly that propels the machine along a travel surface. The drive assembly can be coupled to a power source such as but not limited to an internal combustion engine or an electric motor. The drive assembly can include one or more user inputs that permit an operator of the machine to manually select, from a plurality of different maximum speeds, the maximum speed at which the drive assembly will propel the machine. A different user input can be configured to either propel the machine at the selected maximum speed or to not propel the machine.

For example, the machine can include a first lever that the operator uses to set a maximum travel speed for the machine and a second lever that the operator uses to start and stop the self-propelled travel of the machine. The second lever has an ON state (also referred to as ON position or a drive position) and an OFF state (also referred to as an OFF position or stop position). That is, the machine is either stationary when the second lever is in the OFF state or travels at the maximum speed when the second lever is in the ON state. The operator can vary the travel speed while the machine is travelling by moving the first lever to a speed position that is different from the current position. In order to maintain self-propulsion of the machine, the operator should maintain the second lever in a ON state while moving the first lever to change the travel speed of the machine.

SUMMARY

Some embodiments are directed to a speed control system for an electric drive motor of a self-propelled machine can include a switch assembly, a speed lever, a potentiometer, an actuator lever, a cable, and a controller. The switch assembly can select a requested maximum speed from a plurality of predetermined maximum travel speeds, and can output a maximum speed signal that is indicative of the requested maximum speed. The speed lever can be movable to any of a plurality of travel speeds, including a zero speed. The potentiometer can be configured to output a requested speed signal that is indicative of the requested travel speed. The controller can be configured to output a motor speed signal to the electric drive motor, the motor speed signal is based on the maximum speed signal and the requested speed signal and causes the electric drive motor to operate at an output speed that corresponds to the motor speed signal.

Some embodiments are directed to a speed control system for an electric drive motor of a self-propelled machine can include a rotary switch assembly, a speed lever, a potentiometer, an actuator, a cable, and a controller. The rotary switch assembly can include a geared change lever and a pinion gear that is driven. by the geared change lever. The geared change lever can be movable to select a requested maximum speed from a plurality of predetermined maximum travel speeds, and the rotary switch assembly is configured to output a maximum speed signal that is indicative of the requested maximum speed. The speed lever can be movable to select a requested travel speed from a plurality of travel speeds. The plurality of travel speeds can include a zero speed and at least one intermediate speed that is greater than zero and less than the requested maximum speed. The potentiometer can be configured to output a requested speed signal that is indicative of the requested travel speed and the potentiometer can include an input member. The actuator lever can be connected to the input member. The cable can be connected to each of the speed lever and the actuator lever such that the actuator lever moves when the speed lever moves and the actuator lever moves the input member when the actuator lever moves. The controller can be configured to output a motor speed signal to the electric drive motor. The motor speed signal can be based on the maximum speed signal and the requested speed signal and causes the electric drive motor to operate at an output speed that corresponds to the motor speed signal.

Some embodiments are directed to a speed control system for an electric motor of a self-propelled machine that can include a switch assembly, a speed lever, a potentiometer, an actuator lever, a cable and a controller. The switch assembly can be configured to output a requested maximum speed signal, and can includes a change lever that is movable to select a requested maximum speed from a plurality of predetermined maximum travel speeds. The requested maximum speed signal can be indicative of the requested maximum speed. The speed lever can be movable to between a stop position, a maximum position and an intermediate position that is between the stop position and the maximum position. The potentiometer can be configured to output a requested speed signal based on the position of the speed lever, and the potentiometer can include an input member. The actuator lever can be connected to the input member. The cable connected to each of the speed lever and the actuator lever such that the actuator moves when the speed lever moves and the actuator lever moves the input member when the actuator lever moves. The controller can be configured to output a motor speed signal to the electric motor, the motor speed signal is based on the requested maximum speed signal and the requested speed signal. The requested speed signal can be indicative of a zero speed when the speed lever is in the stop position and indicative of an intermediate speed when the speed lever is in the intermediate position. The intermediate speed can be greater than zero and less than the requested maximum speed. The requested speed signal can be indicative of a travel speed that is equal to the requested maximum speed when the speed lever is in the maximum position.

Some embodiments are directed to a method of controlling a travel speed of a self-propelled machine that can include: selecting a requested maximum speed for the self-propelled power machine from among a plurality of predetermined maximum travel speeds by moving a first lever to a position that corresponds to the requested maximum speed; moving a second lever to one of a stop position, a maximum position and an intermediate position that is between the stop position and the maximum position after selecting the requested maximum speed; causing an electric motor to drive the wheel at an intermediate speed that is greater than zero and less than the requested maximum speed when the second lever is in the intermediate position; causing the electric motor to drive the wheel at the requested maximum speed when the second lever is in the maximum position; and stop causing the electric motor to drive the wheel when the second lever is in the stop position.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

Exemplary embodiments of a walk-behind self-propelled machine made in accordance with principles of the disclosed subject matter can include but are not limited to a lawnmower, a tiller, a lawn edger, an aerator, an applicator, and a snowblower. The machine can also be referred to as a power equipment. In order to vary the travel speed of the machine while it is traveling, the operator should hold the second lever in the drive position with one hand and reach for and move the first lever with the other hand. The first lever can be spaced away from the drive position of the second lever by a distance. Depending on the arm reach of the operator, it is possible for the operator to have a negative perception of the speed adjustment capability of the machine when reaching for and/or moving the first lever while the machine is traveling.

In order to avoid this negative perception, the operator can release the second lever or move the second lever to the OFF state to stop travel of the machine, and the operator can move the first lever while the machine is stationary. Subsequently, the operator can move the second lever to an ON state to resume travel of the machine at the new speed set by the first lever. However, it is possible for the operator to negatively perceive this stopping and restarting the forward motion of the machine in order to achieve a satisfactory travel speed.

Accordingly, it is desirable to provide a speed control system that permits the operator to easily vary the travel speed of the machine while maintaining the forward motion of the machine.

Figure 1:
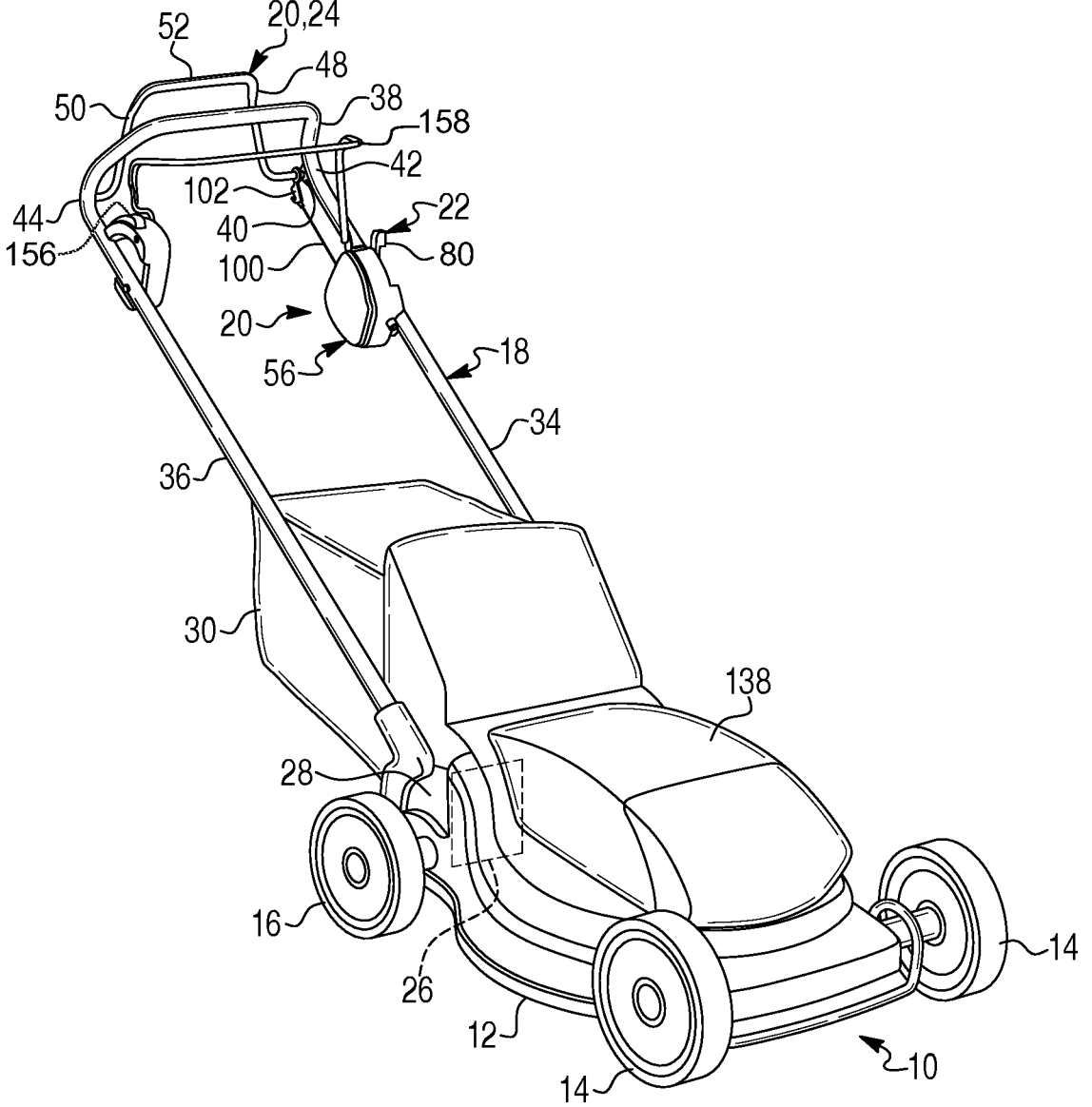
FIG. 1 is a perspective view of a lawnmower made in accordance with principles of the disclosed subject matter.

FIG. 1 illustrates an exemplary embodiment of a walk-behind self-propelled machine that is configured as a lawnmower 10. The lawnmower 10 can include a cutter housing 12, a pair of front wheels 14, a pair of rear wheels 16, a handle 18 and a speed control system 20. The rear wheel 16 on the left side of the lawnmower 10 is obstructed from view in FIG. 1 by the cutter housing 12 and FIG. 2 shows the left rear wheel 16 in phantom.

The speed control system 20 can include a change lever 22 and a speed lever 24. The speed control system 20 can be configured to selectively drive the rear wheels 16 based on the position of each of the levers 22, 24. The operator can manipulate the change lever 22 to set the maximum travel speed of the lawnmower and the speed lever 24 to selectively vary the travel speed of the lawnmower 10 between zero and the maximum travel speed by moving the speed lever 24 between a stop position and a maximum speed position. Referring to FIG. 2, the operator can first move the change lever 22 to any one of a plurality of maximum travel speed positions P1, P2, P3, P4. Subsequently, the operator can move the speed lever 24 from a stop position shown in FIGS. 1, 3 and 5, toward a maximum speed position shown in phantom in FIG. 5. The operator can grasp the speed lever 24 with both hands while varying the travel speed of the lawnmower 10. The speed control system 20 can permit the operator to avoid stopping the forward travel of the lawnmower 10 and reaching for the change lever 22 in order to adjust the travel speed of the lawnmower 10. Further, the speed control system 20 can allow the operator to easily vary the travel speed of the lawnmower 10 and promote a positive perception by the operator of the lawnmower 10. Thus, the speed control system 20 can promote in the operator a positive perception of the lawnmower 10.

Figure 5:
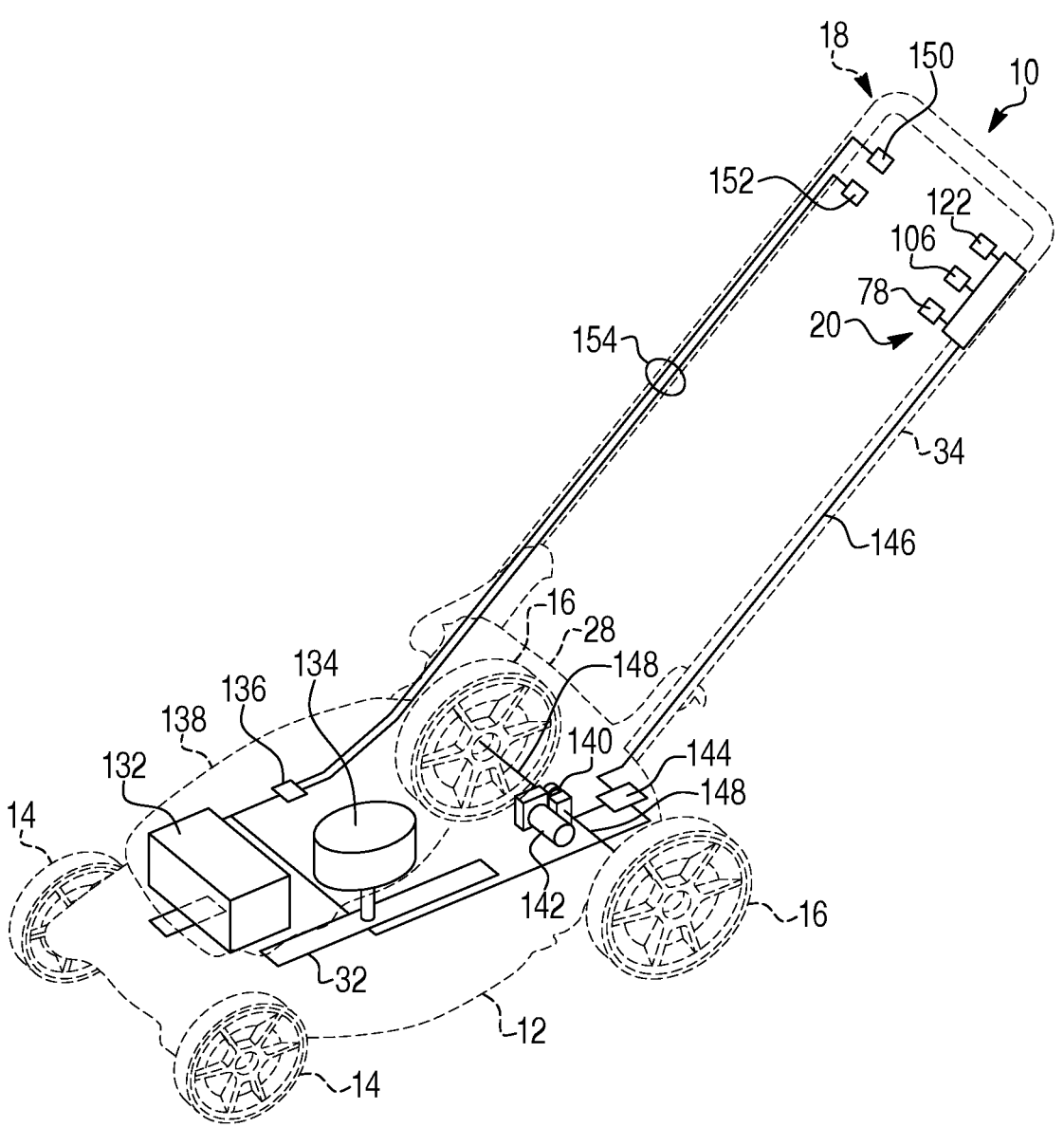
FIG. 5 is a schematic view of a power source assembly for operating a cutting blade and a drive assembly for propelling the lawnmower of FIG. 1, with exterior portions of the lawnmower shown in phantom.

The cutter housing 12 can be referred to as a mower deck or as a cutter deck or as a deck. Returning to FIG. 1, the cutter housing 12 can include an opening 26 at a rear end 28 of the cutter housing 12. The lawnmower 10 can include a collection bag 30 that can be selectively attached to and detached from the rear end 28. Referring to FIG. 5 the lawnmower 10 can include a blade 32 that is housed within the cutter housing 12. The collection bag 30 can be in communication with the opening 26 such that vegetation clippings produced by the blade 32 can be collected in the collection bag 30.

Figure 2:
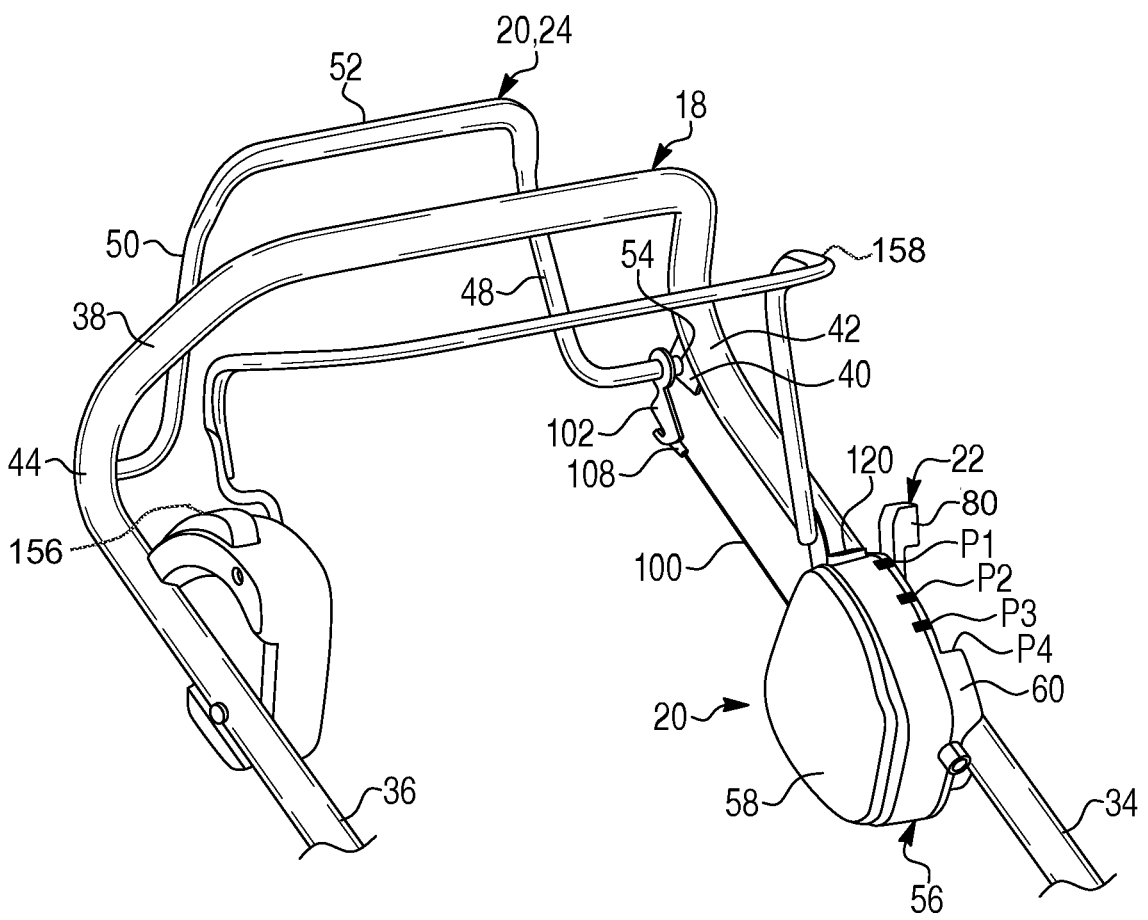
FIG. 2 is a partial perspective view of a handle and a speed control system of the lawnmower of FIG. 1.

Referring to FIGS. 1 and 2, the handle 18 can be connected to the cutter housing 12 at the rear end 28. The handle 18 can include a pair of extensions 34, 36 a cross member 38, a pair of pivot brackets 40, a first junction 42 and a second junction 44. The pivot bracket at the second junction 44 is obstructed from view in FIGS. 1 and 2 by second extension 36 and the second junction 44. The cross member 38 can be connected to the extensions 34, 36 at the junctions 42, 44, respectively.

The change lever 22 can be mounted on the first extension 34 at a location that is spaced away from the cross member 38 in a direction that is toward the cutter housing 12. That is, the change lever 22 can be located on the first extension 34 at a position that is between the cross member 38 and the rear end 28 of the cutter housing 12.

Figure 4:
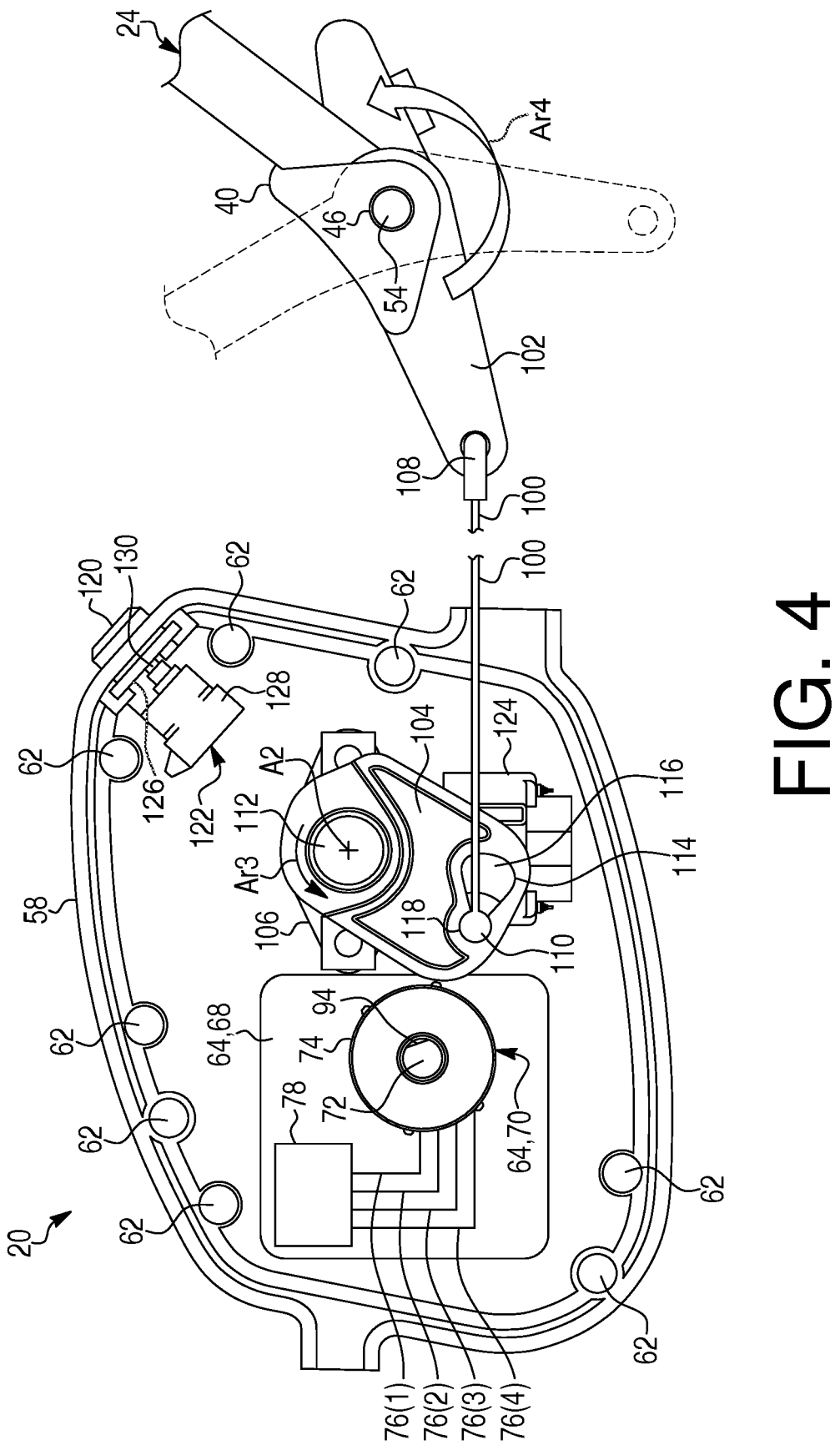
FIG. 4 is a side view of the speed system of the lawnmower of FIG. 1 with the housing member removed, and components of a rotary switch assembly shown in FIG. 3 removed.

The speed lever 24 can be connected to the handle 18 at the first junction 42 and the second junction 44. Referring to FIG. 4, each of the pivot brackets 40 can include a mounting hole 46 and the speed lever 24 can be pivotally connected to the pivot brackets 40 via the mounting holes 46.

Returning to FIGS. 1 and 2, the speed lever 24 can include a pair of pivot arms 48, 50 and a user grip 52 that connects the pivot arms 48, 50 to each other. The first pivot arm 48 can include shaft end 54 (FIGS. 2 and 4) that is rotatably supported in the mounting hole 46 of the pivot bracket 40. The shaft end of the second pivot arm 50 is obstructed from view in FIGS. 1 and 2 and can be similar to or the same as the shaft end 54. The shaft ends 54 can be connected to the pivot brackets 40 in any appropriate manner such as, but not limited to, staking, a cotter pin, or a C-clip.

Figure 3:
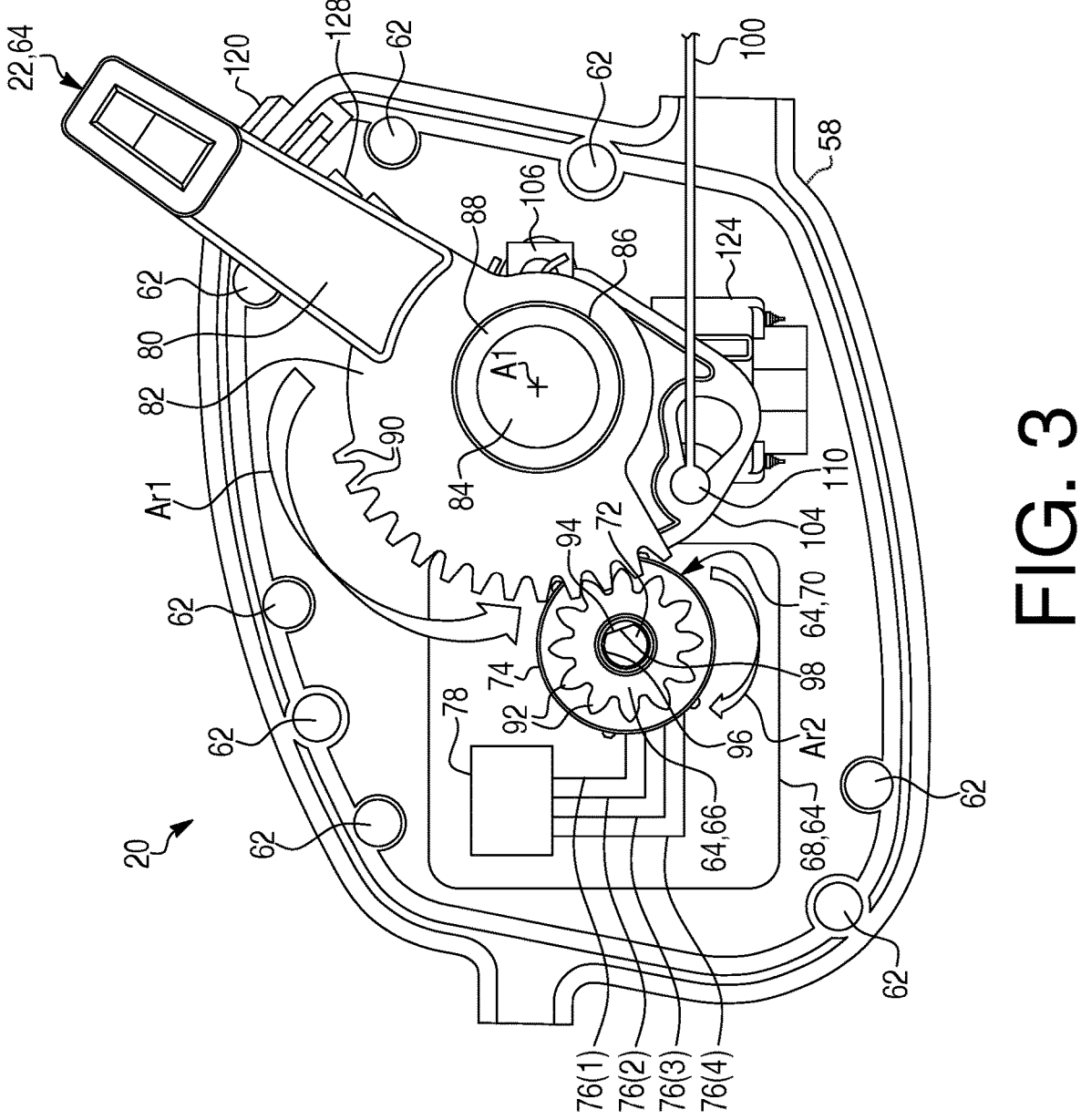
FIG. 3 is a side view of the speed control system of the lawnmower of FIG. 1 with a housing member removed.

The speed control system 20 can include a housing 56 mounted on the first extension 34 of the handle 18. Referring to FIG. 2, the housing 56 can include a first housing part 58 and a second housing part 60. In FIGS. 3 and 4, the second housing part 60 has been removed from the first housing part 58 to show the components of the speed control system 20 that are inside of the housing 56. The first housing part 58 can include a plurality of fastener holes 62 spaced along a perimeter of the first housing part 58. The second housing part 60 can include a complimentary plurality of fastener holes. A respective threaded fastener such as, but not limited to, a screw, can be threaded into a respective one of the fastener holes 62 and a respective one of the fastener holes in the second housing part 60. However, the second housing part 60 can be connected to the first housing part 58 in any appropriate manner such as but not, limited to, one or more resilient clips, one or more clasps, one or more clamps, or any combination of different fastening structures.

Referring to FIG. 3, the speed control system 20 can include a rotary switch assembly 64 that includes the change lever 22, a pinion gear 66, a printed circuit board 68 and an electric switch 70. The operator can pivot the change lever 22 about a first axis A1 to move the change lever 22 to any of the maximum travel speed positions P1, P2, P3, P4. The change lever 22 can drive the pinion gear 66 when the operator pivots the change lever 22. The printed circuit board 68 can include a plurality of output lines 76(1), 76(2), 76(3), 76(4) and a control circuit 78 electrically connected to the output lines 76(1), 76(2), 76(3), 76(4). The control circuit 78 and the output lines 76(1), 76(2), 76(3), 76(4) are schematically illustrated in FIG. 3. The electric switch 70 can include an input member 72 and the pinion gear 66 can drive the input member 72 when the change lever 22 drives the pinion gear 66. The electric switch 70 can electrically connect an electric input of the switch 70 to a respective one of the output lines 76(1), 76(2), 76(3), 76(4) that corresponds to the selected one of maximum travel speed positions P1, P2, P3, P4 that the operator selected with the change lever 22. The control circuit 78 can be configured to output a respective requested maximum speed signal that corresponds to the selected one of maximum travel speed positions P1, P2, P3, P4. The control circuit 78 can be an analog circuit or a digital circuit or include any combination of analog component(s) and digital component(s).

The electric switch 70 can be any rotary switch currently known or developed in the future such that each respective position of an input member 72 connects an electrical input to a respective one a plurality of electrical outputs. The electric switch 70 can include a switch housing 74 and the input member 72 can be a rotary shaft that is rotationally supported by the switch housing 74. The electric switch 70 can include a plurality of output contacts that are spaced around the interior perimeter of the switch housing 74 and the input member 72 can include one end in constant electrical contact with an electrical input and a second end that selectively electrically contacts a respective one of the electrical outputs. A respective one of the output lines 76(1), 76(2), 76(3), 76(4) can electrically connect a respective one of the output contacts of the electric switch 70 to the control circuit 78.

The change lever 22 can include a control arm 80 and a sector gear 82, and the change lever 22 can be referred to as a geared change lever. The second housing part 60 can include a support shaft 84. The support shaft 84 can be integrally formed with the second housing part 60 and can protrude from an inner surface of the second housing part 60 that faces the first housing part 58. The sector gear 82 can include a bearing hole 86 and the change lever 22 can include a journal bearing 88 in the bearing hole 86 and rotatably mounted on the support shaft 84. The first axis A1 can be centered on the support shaft 84. The control arm 80 can pivot about the first axis A1 and the sector gear 82 can rotate about the first axis A1 as the control arm 80 moves among the different maximum travel speed positions P1, P2, P3, P4.

For example, when the operator moves the change lever 22 from the first maximum speed position P1 toward any of the other maximum travel speed positions P2, P3, P4 in the direction of a first arrow Ar1, the sector gear 82 can drive the pinion gear 66 in the direction of a second arrow Ar2. The pinion gear 66 can drive the input member 72 in the direction of the second arrow Ar2 to connect the electric switch 70 to a respective one of the output lines 76(1), 76(2), 76(3), 76(4).

The sector gear 82 can include a plurality of teeth 90 and the pinion gear 66 can include a plurality of teeth 92 that engage the teeth 90 of the sector gear 82. The sector gear 82 can span an arclength that is less than 360 degrees and the teeth 90 can span an arclength that is the same as or less than the arclength of the sector gear 82. The teeth 92 of the pinion gear 66 can be spaced along the entire circumference of the pinion gear 66. The gear ratio of the sector gear 82 and the pinion gear 66 can be any appropriate ratio that enables the change lever 22 to move the input member 72 of the electric switch 70 into the proper position to connect the electric switch 70 to the output lines 76(1), 76(2), 76(3), 76(4) when the lever is in any of the maximum travel speed positions P1, P2, P3, P4.

The input member 72 can include a flat surface 94 and the pinion gear 66 can include a through hole 96 that is bounded, in part, by a flat surface 98. The input member 72 can be inserted into the through hole 96 with the flat surfaces 94, 98 aligned with and abutting each other. The abutting flat surfaces 94, 98 can create a torque transmitting connection between the pinion gear 66 and the input member 72.

Referring to FIGS. 1, 2 and 4, the speed control system 20 can include a cable 100, a cable lever 102, an actuator 104 (FIG. 4) and a potentiometer 106 (FIG. 4). The cable lever 102 can be fixed to the speed lever 24 so that the cable lever 102 is stationary with respect to the speed lever 24 in any appropriate manner such as, but not limited to, a weld, flat mating surfaces (such as flat surfaces 94, 98) or splines. A first end 108 of the cable 100 can be connected to the cable lever 102 and the second end 110 (see FIGS. 3 and 4) can be connected to the actuator lever 104. The ends 108, 110 can be connected to the cable 100, and the respective one of the cable lever 102 and the actuator lever 104 in any appropriate manner.

Referring to FIG. 4, the potentiometer 106 can include an input member 112 such as but not limited to a rotating shaft that is rotatable about a second axis A2. The potentiometer 106 can be any currently known or future developed potentiometer 106 that can vary an output signal as the input member 112 moves. The actuator lever 104 can be connected to the input member 112 in any appropriate manner, such as but not limited to mating flat surface or splines, that cause the input member 112 to rotate about the second axis A2 when the actuator lever 104 pivots about the second axis A2.

The second axis A2 can be coaxial with the first axis A1. The end of the support shaft 84 can be adjacent to and spaced away from the end of the input member 112 in a direction that is parallel to the axes A1, A2. The actuator lever 104 and the change lever 22 can be spaced away from each other in the direction that is parallel to the axes A1, A2. The actuator lever 104 can pivot about the second axis A2 independently of the movement and position of the change lever 22, and the change lever 22 can pivot about the first axis A1 independent of the movement and position of the actuator lever 104.

The actuator lever 104 can include a window 114 that has an irregular shape that includes an enlarged portion 116 and a semi-circular portion 118. The second end 110 can be in the semi-circular portion. The semi-circular portion can have an arclength that is greater than 180 degrees so that the semi-circular portion retains the second end 110 of the cable 100 when the speed lever 24 pulls the cable 100. The opening between the semi-circular portion and the enlarged portion can be smaller than a relevant dimension of the second end 110.

Referring to FIGS. 3 and 4, the speed control system 20 can include a wake button 120, a wake switch 122 (FIG. 4) and an electrical connector 124. The wake button 120 can protrude from an inside to an outside of the housing 56. The wake switch 122 and the electrical connector 124 can be contained in the housing 56. The electrical connector 124 can be electrically connected to each of the control circuit 78, the potentiometer 106 and the wake switch 122.

Referring to FIG. 4, the wake button 120 can include a contact surface 126 and the wake switch 122 can include a switch housing 128 and a push button 130. The contact surface 126 can abut the push button 130 and can move the push button 130 from an OFF position to an ON position by depressing the wake button toward the housing 56. The push button 130 can be biased toward the OFF position and return to the OFF position when an input from the wake button 122 is absent.

FIG. 5 schematically illustrates powered components and the electrical system of the lawnmower 10. The cutter housing 12, wheels 14, 16 and handle 18 are shown in phantom and the collection bag 30 is omitted for clarity and simplicity of the drawing. The lawnmower 10 can include a battery pack 132, a blade motor 134, a blade motor driver 136, a gear transmission 140, a propulsion motor 142 and a propulsion motor driver 144. Returning to FIGS. 1 and 5 collectively, the lawnmower 10 can include a housing 138 that contains the battery pack 132, the blade motor 134 and the blade motor driver 136. Returning to FIG. 5, the gear transmission 140, the propulsion motor 142 and the propulsion motor driver 144 can be spaced away from the housing 138. The gear transmission 140 and the propulsion motor 142 can be mounted to the cutter housing 12 at a position that is underneath the cutter housing 12. The propulsion motor driver 144 can be mounted on the lawnmower 10 at any appropriate position.

A propulsion wire harness 146 can electrically connect the electrical connector 124 to the propulsion motor driver 144 and the battery 132 can be electrically connected to the propulsion motor driver 144. The propulsion wire harness 146 can be located inside or mounted outside and extend along the first extension 34 of the handle 18. The propulsion wire harness 146 can include one or more than one electrical wire such that all of the signals can be received from and electrical power supplied to electrical and electronic components of the speed control system 20.

The battery pack 132 can include at least one battery cell and a case that houses the at least one battery cell. The battery cell can be configured to store electricity and supply electricity to the blade motor 134 and/or the propulsion motor 142.

The propulsion motor driver 144 can be in electrical communication with each of the battery pack 132, the propulsion motor 142 and the speed control system 20. The lawnmower 10 can include a drive shaft 148 that is connected to each of the gear transmission 140 and the rear wheels 16 in any appropriate manner such that the gear transmission 140 can cause the drive shaft 148 to rotate, which in turn can cause the rear wheels 16 to rotate.

The gear transmission 140 can connect the propulsion motor 142 to the drive shaft 148. The propulsion motor 142 can be a direct current electric motor or an alternating current electric motor.

The propulsion motor driver 144 can be configured to convert power from the battery pack 132 into output power supplied to the propulsion motor 142 based on signals the propulsion motor driver 144 receives from the speed control system 20. The propulsion motor driver 144 can be configured to monitor the operational conditions of the propulsion motor 142 and the battery pack 132. The propulsion motor driver 144 can be configured to control the voltage or current output by the battery pack 132 based on the operational conditions of the propulsion motor 142 and the battery pack 132 by switching one or more power transistors to adjust the supply of electrical power to the propulsion motor 142. The propulsion motor driver 144 can also be configured to control the voltage or current output by the battery pack 132, and to supply the voltage or current to the propulsion motor 142 based on the signal(s) received from the speed control system 20 using the one or more power transistors. The propulsion motor driver 144 can be configured to initiate, adjust or terminate a supply of voltage or current from the battery pack 132 to the propulsion motor 142 based on inputs received from the battery pack 132, the propulsion motor 142 and the speed control system 20.

The propulsion motor driver 144 driver can operate in a normal mode and a sleep mode. The propulsion motor driver 144 can operate in the normal mode when the lawnmower 10 is in use by an operator, and in the sleep mode when the lawnmower 10 has been unused for a predetermined period of time. When in the sleep mode, the propulsion motor driver 144 can be configured to consume less power as compared to the normal mode and ignore any signal or command from the either or both of the control circuit 78 and the potentiometer 106. In alternate embodiments, the propulsion motor driver 144 can be configured to turn off a power supply from the battery 132 to either or both of the control circuit 78 and the potentiometer 106.

The wake switch 122 can transmit a wake signal or wake command to propulsion motor driver 144 when the operator depresses the wake button 120. The wake signal can cause the propulsion motor driver 144 to transition from the sleep mode to the normal mode. The propulsion motor driver 144 can be configured to transition from the normal mode to the sleep mode when the propulsion motor driver 144 receives a zero speed signal from the potentiometer 106 for a predetermined time period.

To initiate self-propelled travel of the lawnmower 10 when the lawnmower 10 has been unused for a predetermined time period and the propulsion motor driver 144 is in the sleep mode, the operator can depress the wake button 120. In response, the push button 130 of the wake switch 122 can move from the OFF position to the ON position and send a wake signal (also referred to as a wake command) to the propulsion motor driver 144. The propulsion motor driver 144 can be configured to signal the operator that the propulsion motor driver 144 is in the normal mode by causing audible message and/or a visual message to be emitted. The change lever 22 can be in any of the maximum speed positions P1, P2, P3, P4 when the operator depresses the wake button 120. It can be advantageous if the speed lever 24 is in a stop position when the operator depresses the wake button 120. The stop position of the speed lever 24 is shown in FIGS. 1, 2 and 4.

After depressing the wake button 120 or receiving the audible and/or visual message from the propulsion motor driver 144, the operator can move the change lever 22 to a desired one of the maximum speed positions P1, P2, P3, P4. The control circuit 78 can be configured to transmit a requested maximum speed signal (also referred to as a requested maximum speed command) to the propulsion motor driver 144 via the electrical connector 124 and the propulsion wire harness 146. The requested maximum speed signal can be indicative of the maximum travel speed that is desired by the operator out of a plurality of predetermined maximum travel speeds that correspond to the maximum speed positions P1, P2, P3, P4. The propulsion motor driver 144 can be configured to set a predetermined maximum output speed of the propulsion motor 142 that corresponds the maximum speed signal.

After depressing the wake button 120 and moving the change lever 22 into the desired one of the maximum speed positions P1, P2, P3, P4, the operator can move the speed lever 24 from the stop position toward a maximum position where the user grip 52 of the speed lever 24 is adjacent to or abuts the cross member 38 of the handle 18. FIG. 4 shows the speed lever 24 in the maximum position. For example, the operator can pivot the speed lever 24 in the direction of a fourth arrow Ar4 shown in FIG. 3 to move the speed lever 24 from the stop position shown in solid lines in FIG. 4 to a maximum position shown in dotted lines. The speed lever 24 can abut the cross member 38 of the handle 18 when the speed lever 24 is in the maximum position. The speed lever 24 and the cable 100 can pivot the actuator lever 104 in the direction of a third arrow Ar3 when the speed lever 24 pivots in the direction of the fourth arrow Ar4

The potentiometer 106 can be configured to output a requested speed signal (also referred to as a requested speed command) when the propulsion motor driver 144 is in the normal mode, regardless of the position of the speed lever 24. However, the potentiometer 106 can be configured to vary the requested speed signal as the speed lever 24 moves and causes the input member 112 to move via the cable 100 and the actuator lever 104.

The potentiometer 106 can be configured to output a requested travel speed signal (or requested travel speed command) that varies as the position of the speed lever 24 varies. The requested speed signal can be indicative of a speed of zero when the speed lever 24 is in the stop position, the requested speed signal can be indicative of the maximum speed when the speed lever 24 is in the maximum position, and the requested speed signal can be indicative of a speed that is greater than zero and less than the maximum speed when the speed lever 24 is spaced away from both of the stop position and the maximum position, where the maximum speed is set by the change lever 22 and the control circuit 78.

The propulsion motor driver 144 can be configured to output a motor speed signal that causes the propulsion motor 142 to operate at an output speed that corresponds to the motor speed signal and corresponds to the travel speed requested by the operator. The propulsion motor driver 144 can be configured to cause the output speed of the propulsion motor 142 to increase as the speed lever 24 moves toward the maximum position and decrease the output speed of the propulsion motor 142 as the speed lever moves toward the stop position. The propulsion motor driver 144 can be configured to vary the motor speed signal as the speed lever 24 moves such that the output speed of the propulsion motor varies continuously or in predetermined discrete increments.

Thus, the operator can simply set a maximum travel speed for the lawnmower by moving the change lever 22 to any of the maximum speed positions P1, P2, P3, P4 and then vary the travel speed of the lawnmower 10 between a plurality of different speeds within the range of zero speed and the selected maximum travel speed by simply moving the speed lever 24 between the stop position and the maximum position. Accordingly, the speed control system 20 can promote in the operator a positive perception of the lawnmower 10 and its usage.

Returning to FIG. 5, the lawnmower 10 can include a second wake switch 150, a blade brake switch 152 and a blade wire harness 154 that electrically connects the switches 150, 152 to the blade motor driver 136. The blade motor driver 136 can operate in a wake mode or a normal mode as described above with respect to the propulsion motor driver 144.

Returning to FIGS. 1 and 2, the lawnmower 10 can include a wake button 156 and a blade brake lever 158 mounted on the handle 18. The second wake switch 152 can be configured to output a signal to the blade motor driver 136 when the operator depresses the wake button 156. The blade motor driver 136 can be configured to cause the blade motor 134 to stop rotating when the blade brake lever 158 is in the stop position shown in FIGS. 1 and 2. The blade motor driver 136 can be configured to cause the blade motor 134 to rotate the blade 32 when the blade brake lever abuts the cross member 38 of the handle 18.

Each of the propulsion motor driver 144 and the blade motor driver 136 can be referred to as a controller, a processor based controller, a microcontroller, a microcomputer, and electronic control unit, or an ECU. The drivers 136, 144 can be configured with hardware and/or software that permit the drivers 136, 144 to operate as described above. The drivers 136, 144 can include or be electrically connected to RAM, ROM and/or any other appropriate memory device.

While certain embodiments of the invention are described above, it should be understood that the invention can be embodied and configured in many different ways without departing from the spirit and scope of the invention.

For example, embodiments are disclosed above in the context of change lever 22 that includes a sector gear 82 and a control arm 80 shown in FIG. 3. However, alternate embodiments can replace the pivoting change lever 22 with a sliding input member that includes a rack gear. The rack gear can include teeth that engage the teeth 92 of the pinion gear 66. The operator can slide the sliding member to select the desired one of the maximum speed positions P1, P2, P3, P4 and the rack can drive the pinion gear 66 as the operator slides the input member.

Instead of the change lever 22 and the pinion gear 66, alternate embodiments can include any appropriate mechanical linkage that translates motion of a mechanical input member into rotation of the input member 72. The mechanical input member can be pivoting lever, a sliding button, a rotary knob or any other appropriate structure. In alternate embodiments, the mechanical input member can be directly connected to the input member 72. In alternate embodiments, the mechanical input member can be indirectly connected to the input member 72 by any appropriate structure such as, but not limited to one or more levers, a lever directly connected to the input member 72 and a cable connected to the lever to the mechanical input member.

The cable 100 can be a single cable, a cable/spring combination, a spring, or other linkage capable of effecting the desired and described function.

Instead of the control circuit 78 being mounted on the printed circuit board 68 and spaced away from the propulsion motor driver 144, the control circuit 78 can be located on a printed circuit board that also includes the propulsion motor driver 144. In alternate embodiments, the control circuit can be omitted and the propulsion motor driver 144 can be configured to create the requested maximum speed signal.

Instead of using the separate drivers 136, 144 to control a respective one of the motors 134, 142, the lawnmower 10 can include a single controller that performs all of the operations described above. Alternate embodiments can include both of the drivers 136, 144 and both of the drivers 136, 144 can be configured to perform any or all of the operations described above.

Instead of the wake button 120 being a depressible button, the wake button 120 can be a rotary dial that include a cam surface that engages the push button 130 of the wake switch 122. In alternate embodiments, the wake button 120 can be a rotary dial and the wake switch 122 can be a rotary switch, or the wake button(s) can be incorporated into a touch screen on the machine.

Although the speed control system 20 shown in FIG. 2 includes four maximum speed positions P1, P2, P3, P4, the speed control system 20 can have any appropriate number of positions, or can be a continuous range of speeds. In alternate embodiments, instead of distinct stripes, the indicia for the different speed positions can be represented as a triangular shape where the narrow end represents the slowest maximum speed and the wide end represents the fastest maximum speed.

Instead of mounting the housing 56 on an inner side of the first extension 34 of the handle 18, such that the housing 56 is located between the extension 34, 36 of the handle 18. In alternate embodiments, the housing 56 can be mounted on a top, bottom, or other side surface of the extension(s) 34, 36.

Instead of the first axis A1 being coaxial with the second axis A2, alternate embodiments can include the support shaft 84 spaced away from the potentiometer 106 such that the axes A1, A2 are not coaxial.

Instead of the first axis A1 being spaced away from the pinion gear 66 as shown in FIG. 3, the support shaft 84 and the input shaft 72 can be coaxial the first axis A1 as the common axis and the second gear 82 can have internal teeth instead of the external teeth 90, where the internal teeth engage the external teeth 92 of the pinion gear 66.

Instead of the flat surfaces 94, 96, in alternate embodiments, the input member 72 and the pinion gear 66 can be connected together in any appropriate manner such as, but not limited to, a keyed joint or spline(s).

What is claimed is:

1. A speed control system for an electric drive motor of a self-propelled machine, comprising:
   a rotary switch assembly that includes,
      a geared change lever that is movable to select a requested maximum speed from a plurality of predetermined maximum travel speeds, the rotary switch assembly is configured to output a maximum speed signal that is indicative of the requested maximum speed, and
      a pinion gear driven by the geared change lever, a speed lever that is movable to select a requested travel speed from a plurality of travel speeds, the plurality of travel speeds includes a zero speed and at least one intermediate speed that is greater than zero and less than the requested maximum speed;
   a potentiometer that is configured to output a requested speed signal that is indicative of the requested travel speed and the potentiometer includes an input member;
   an actuator lever that is connected to the input member;
   a cable connected to each of the speed lever and the actuator lever such that the actuator lever moves when the speed lever moves and the actuator lever moves the input member when the actuator lever moves; and
   a controller configured to output a motor speed signal to the electric drive motor, the motor speed signal is based on the maximum speed signal and the requested speed signal and causes the electric drive motor to operate at an output speed that corresponds to the motor speed signal.

2. The speed control system according to claim 1, wherein the speed lever is movable between a stop position and maximum position, the speed lever selects the zero speed when the speed lever is in the stop position, the speed lever selects the requested maximum speed when the speed lever is in the maximum position, and the speed lever selects the intermediate speed when the speed lever is spaced away from both of the stop position and the maximum speed position.

3. The speed control system according to claim 2, wherein
   the potentiometer is configured to vary the requested speed signal as the speed lever moves from the stop position toward the maximum position, and
   the controller is configured to vary the motor speed signal as the requested speed signal varies.

4. The speed control system according to claim 2, wherein
   the speed lever pulls on the cable when the speed lever moves away from the stop position and toward the maximum position,
   the cable pulls on the actuator lever when the speed lever pulls on the cable,
   the actuator lever moves when the cable pulls on the actuator lever, and
   the input member is a shaft, and the actuator lever rotates the shaft when the actuator lever moves.

5. The speed control system according to claim 2, wherein
   the requested speed signal is indicative of the zero speed when the speed lever is in the stop position,
   the requested speed signal is indicative of the intermediate speed when the speed lever is spaced away from both of the stop position and the maximum position, and
   the requested speed signal is indicative of a travel speed that is equal to the requested maximum speed when the speed lever is in the maximum position.

6. The speed control system according to claim 1, wherein the controller is configured to vary the motor speed signal as the speed lever moves between a stop position that corresponds to the zero speed and a maximum position that corresponds to the requested travel speed such that the output speed of the electric drive motor continuously increases as the speed lever moves away from the stop position and toward the maximum position.

7. The speed control system according to claim 1, wherein the geared change lever includes:
   a sector gear that engages the pinion gear; and
   a control arm that is connected to and extends away from the sector gear,
   the rotary switch assembly includes a rotary shaft, the pinion gear is mounted on the rotary shaft and configured to rotate the rotary shaft when the control arm rotates the sector gear.

8. The speed control system according to claim 7, further comprising:

a housing that contains the sector gear and the pinion gear and rotatably supports the geared change lever, wherein the rotary switch assembly includes:

a printed circuit board that is contained in the housing, and switch housing that is mounted on the printed circuit board and rotatably supports the rotary shaft.

9. The speed control system according to claim 1, wherein the rotary switch assembly includes an analog circuit that is in electrical communication with the controller, the analog circuit is configured to output the requested maximum speed signal.

10. The speed control system according to claim 1, further comprising:

a housing that contains the pinion gear and the potentiometer, the housing pivotally supports the gear change lever, wherein the rotary switch assembly includes a printed circuit board contained in the housing, and a switch housing that is mounted on the printed circuit board and rotationally supports the pinion gear, the printed circuit board is configured to output the requested maximum speed signal.

11. The speed control system according to claim 10, further comprising:

a wake button movably mounted on the housing; and a wake switch in electrical communication with the controller and configured to output a wake signal to the controller when the wake button turns the wake switch ON.

12. A self-propelled machine, comprising:

the speed control system according to claim 10;

a main body;

a pair of drive wheels rotatably supported by the main body;

a tool rotatably supported by the main body;

a second electric motor mounted on the main body, connected to the tool, and configured to drive the tool; and a handle connected to and extending away from the main body, the housing is mounted on the handle, and the speed lever is pivotally mounted on the handle, wherein the electric drive motor is mounted on the main body, connected to at least one of the drive wheels, and configured to drive the at least one of the drive wheels based on the motor speed signal.

13. The self-propelled machine according to claim 12, further comprising:

a pair of second wheels rotatably supported by the main body, wherein the main body includes a cutting chamber located between the pair of second wheels and the pair of drive wheels, and the tool is a vegetation cutting blade that is located in the cutting chamber.

14. A method of controlling a travel speed of a self-propelled machine using the speed control system of claim 1, comprising:

selecting the requested maximum speed for the self-propelled machine from among the plurality of predetermined maximum travel speeds by moving the geared change lever to a position that corresponds to the requested maximum speed;

moving the speed lever to one of the stop position, the maximum position and the intermediate position that is between the stop position and the maximum position after selecting the requested maximum speed;

causing the electric drive motor to drive the wheel at the intermediate speed that is greater than zero and less than the requested maximum speed when the speed lever is in the intermediate position;

causing the electric drive motor to drive the wheel at the requested maximum speed when the speed lever is in the maximum position; and stop causing the electric drive motor to drive the wheel when the speed lever is in the stop position.

15. The method according to claim 14, further comprising:

waking up the controller before the selecting the requested maximum speed, wherein the causing the electric drive motor to drive the wheel at the intermediate speed includes continuously increasing a drive speed of the wheel as the speed lever moves away from stop position and toward the maximum position.

16. A speed control system for an electric motor of a self-propelled machine, comprising:

a switch assembly that is configured to output a requested maximum speed signal, the switch assembly includes:

a change lever that is movable to select a requested maximum speed from a plurality of predetermined maximum travel speeds, the requested maximum speed signal is indicative of the requested maximum speed; and a speed lever that is movable to between a stop position, a maximum position and an intermediate position that is between the stop position and the maximum position;

a potentiometer that is configured to output a requested speed signal based on the position of the speed lever, and the potentiometer includes an input member;

an actuator lever that is connected to the input member;

a cable connected to each of the speed lever and the actuator lever such that the actuator moves when the speed lever moves and the actuator lever moves the input member when the actuator lever moves; and a controller configured to output a motor speed signal to the electric motor, the motor speed signal is based on the requested maximum speed signal and the requested speed signal, wherein the requested speed signal is indicative of a zero speed when the speed lever is in the stop position, the requested speed signal is indicative of an intermediate speed when the speed lever is in the intermediate position, the intermediate speed is greater than zero and less than the requested maximum speed, the requested speed signal is indicative of a travel speed that is equal to the requested maximum speed when the speed lever is in the maximum position.

17. The speed control system according to claim 16, wherein the intermediate speed signal varies continuously as the speed lever moves within a range of positions that are spaced away from both of the stop position and the maximum position, and the controller is configured to continuously vary the motor speed signal as the intermediate speed signal varies.

18. The speed control system according to claim 16, the change lever includes:

a sector gear;

a control arm that is connected to and extends away from the sector gear, the rotary switch assembly includes a rotary shaft; and a pinion gear mounted on the rotary shaft, engaging the sector gear, and configured to rotate the rotary shaft when the control arm moves.

19. The speed setting system according to claim 18, further comprising:

a housing containing the sector gear, the pinion gear, and potentiometer, and the housing pivotally supports the geared change lever, wherein the control arm protrudes from the housing.

20. The speed setting system according to claim 16, wherein the input member is a rotatable shaft, and the change lever pivots about an axis that is coaxial with the rotatable shaft and independently of the rotary shaft.

* * * * *